(12) United States Patent
Wu et al.

(10) Patent No.: US 11,641,613 B2
(45) Date of Patent: May 2, 2023

(54) METHOD AND APPARATUS FOR RELAY DISCOVERY

(71) Applicant: LENOVO (BEIJING) LIMITED, Beijing (CN)

(72) Inventors: Lianhai Wu, Beijing (CN); Jing Han, Beijing (CN); Haiming Wang, Beijing (CN); Jie Shi, Beijing (CN); Hongchao Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 215 days.

(21) Appl. No.: 17/044,945

(22) PCT Filed: Apr. 4, 2018

(86) PCT No.: PCT/CN2018/081975
§ 371 (c)(1),
(2) Date: Oct. 2, 2020

(87) PCT Pub. No.: WO2019/191955
PCT Pub. Date: Oct. 10, 2019

(65) Prior Publication Data
US 2021/0037446 A1  Feb. 4, 2021

(51) Int. Cl.
*H04W 40/22* (2009.01)
*H04W 40/24* (2009.01)
*H04W 40/26* (2009.01)

(52) U.S. Cl.
CPC ......... *H04W 40/22* (2013.01); *H04W 40/246* (2013.01); *H04W 40/26* (2013.01)

(58) Field of Classification Search
None
See application file for complete search history.

(56) References Cited

U.S. PATENT DOCUMENTS

| 10,873,413 B2* | 12/2020 | Zhang .................. H04L 1/0003 |
| 2009/0285149 A1* | 11/2009 | Kwon .................. H04L 45/122 370/329 |
| 2009/0290528 A1* | 11/2009 | Kwon .................... H04L 43/50 370/315 |
| 2011/0249558 A1 | 10/2011 | Raaf et al. |
| 2015/0365876 A1 | 12/2015 | Wang et al. |

(Continued)

FOREIGN PATENT DOCUMENTS

| CN | 101932120 A | 12/2010 |
| CN | 105578560 A | 5/2016 |

(Continued)

OTHER PUBLICATIONS

PCT/CN2018/081975, "International Search Report and the Written Opinion of the International Search Authority" ISA/CN, State Intellectual Property Office of the P.R. China, dated Jan. 1, 2019, pp. 1-9.

(Continued)

*Primary Examiner* — Brian S Roberts
(74) *Attorney, Agent, or Firm* — Kunzler Bean & Adamson (57) ABSTRACT

The present disclosure relates to methods and apparatuses. According to some embodiments of the disclosure, a method comprises: receiving a broadcasting message from a base station, wherein the broadcasting message indicates that the base station supports relaying function.

14 Claims, 9 Drawing Sheets

(56) References Cited

U.S. PATENT DOCUMENTS

| | | |
|---|---|---|
| 2016/0037568 A1 | 2/2016 | Hakola et al. |
| 2016/0044710 A1* | 2/2016 | Lee .................... H04W 52/383 |
| | | 370/312 |
| 2016/0286374 A1 | 9/2016 | Baghel et al. |
| 2016/0295494 A1* | 10/2016 | Gulati ................ H04B 7/15507 |
| 2017/0126306 A1 | 5/2017 | Kim et al. |
| 2019/0110268 A1* | 4/2019 | Abedini .............. H04W 56/002 |
| 2019/0124696 A1* | 4/2019 | Islam ................... H04W 92/20 |
| 2019/0297555 A1* | 9/2019 | Hampel ................ H04W 40/28 |

FOREIGN PATENT DOCUMENTS

| | | | |
|---|---|---|---|
| EP | 2768156 A1 | 8/2014 | |
| WO | WO-2016054893 A1 * | 4/2016 | ............ H04W 48/10 |

OTHER PUBLICATIONS

Qualcomm Incorporated, IAB Topology and Route Management, 3GPP TSG-RAN WG3 Meeting #99, R3-181080, Jan. 26-Mar. 2, 2018, pp. 1-5, Athens, Greece.

AT&T, Discussion on NSA/SA support for IAB architectures, 3GPP TSG-RAN WG3 Meeting #99, R3-181346, Feb. 26-Mar. 2, 2018, pp. 1-4, Athens, Greece.

* cited by examiner

METHOD AND APPARATUS FOR RELAY DISCOVERY

TECHNICAL FIELD

The present disclosure generally relates to wireless communication technology, especially for relay discovery and communication in a wireless communications system.

BACKGROUND

In the 3rd Generation Partnership Project (3GPP), deployment of Relay Nodes (hereinafter referred to as RNs) in a wireless communication system is promoted. One of the main objectives for deploying RNs is to enhance coverage area of a Base Station (hereinafter referred to as BS) by improving throughput of a mobile device (also known as a user equipment (UE)) that locates in a coverage hole or far from the base station resulting in low signal quality.

In a wireless communication system employing RNs, a BS that can provide connection to at least one RN is called a Donor BS. A RN can access a Donor BS by using an attach procedure. The RN may hop through one or more RNs before reaching the Donor BS, or may be directly connected to the Donor BS. Therefore, there is a need for handling the relationship between a RN and its neighboring RN(s) when multiple-hop is supported in the wireless communication system. In addition, a procedure for discovering RN and its Donor BS, as well as its neighboring RN(s) is desirable.

SUMMARY OF THE DISCLOSURE

One embodiment of the present disclosure provides a method, comprising: receiving a broadcasting message from a base station, wherein the broadcasting message indicates that the base station supports relaying function.

Another embodiment of the present disclosure provides a method, comprising: broadcasting, at a first communication device, assistant information for discovering neighboring communication devices, wherein the assistant information includes an identification of the first communication device and an identification of a base station serving the first communication device.

Yet another embodiment of the present disclosure provides a method, comprising: receiving, from a first communication device, assistant information for discovering neighboring communication devices, wherein the assistant information includes an identification of the first communication device and an identification of a base station serving the first communication device.

Yet another embodiment of the present disclosure provides a non-transitory computer-readable medium having stored thereon computer-executable instructions to cause a processor to implement the above method.

Yet another embodiment of the present disclosure provides an apparatus, comprising: a non-transitory computer-readable medium having stored thereon computer-executable instructions to cause a processor to implement the above method; a receiving circuitry; a transmitting circuitry; and a processor coupled to the non-transitory computer-readable medium, the receiving circuitry and the transmitting circuitry.

Yet another embodiment of the present disclosure provides a method, comprising: broadcasting, from a base station, a message indicates that the base station supports relaying function.

Yet another embodiment of the present disclosure provides a method, comprising: receiving, at a base station, information indicating neighboring communication devices of a first communication device, wherein the information includes a device list comprising a second communication device, the second communication device is located within the coverage of the base station, and the channel quality between the first communication device and the second communication device is equal to or greater than a threshold for relay selection; and transmitting reconfiguration information to the first communication device, wherein the reconfiguration information includes a updated device list.

Yet another embodiment of the present disclosure provides a method, comprising: receiving, at a base station, a request for allocating resource for a connection between a first communication device and a second communication device, wherein the second communication device is located out of the coverage of the base station, the request for allocating resource includes an identification of the second communication device, the channel quality between the first communication device and the second communication device is equal to or greater than a threshold for relay selection; and transmitting an acknowledgement of the request for allocating resource to the first communication device.

Yet another embodiment of the present disclosure provides a non-transitory computer-readable medium having stored thereon computer-executable instructions to cause a processor to implement the above method.

Yet another embodiment of the present disclosure provides an apparatus, comprising: a non-transitory computer-readable medium having stored thereon computer-executable instructions to cause a processor to implement the above method; a receiving circuitry; a transmitting circuitry; and a processor coupled to the non-transitory computer-readable medium, the receiving circuitry and the transmitting circuitry.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only example embodiments of the disclosure and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Figure 1:
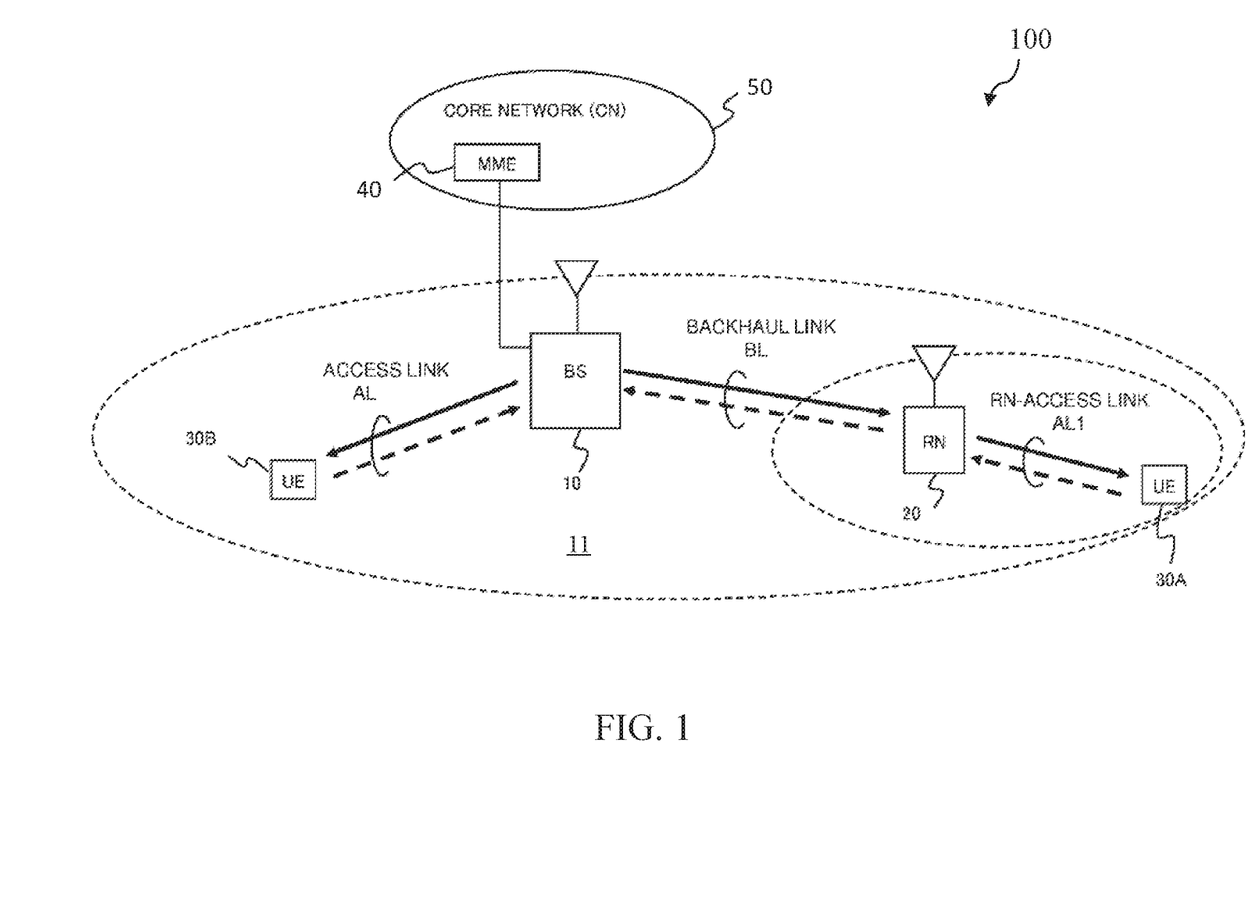
FIG. 1 illustrates a schematic wireless communication system according to an embodiment of the present disclosure.

FIG. 1 illustrates a wireless communication system 100 according to an embodiment of the disclosure.

As shown in FIG. 1, it is assumed for simplicity that the wireless communication system 100 is comprised of a plurality of nodes, including BS 10, RN 20, and a plurality of UEs 30, including UEs 30A and 30B. However, the wireless communication system 100 may also comprise of a plurality of BSs and a plurality of RNs.

The BS 10 operates under the control of a Mobility Management Entity (MME) 40 and is connecting to a Core Network (CN) 50. The core network also includes a Home Subscriber Server (HSS) (not shown), which is in communication with the MME. The BS 10 may be based, for example, on the standards of long-term evolution (LTE), LTE-Advanced (LTE-A), new radio (NR), or other suitable standards. For example, the BS 10 may be an eNB or a gNB, and may define one or more cells, such as cell 11. UEs 30A and/or 30B may be a computing device, a wearable device, and a mobile device, etc. Persons skilled in the art should understand that as the 3GPP (3rd Generation Partnership Project) and the communication technology develop, the terminologies recited in the specification may change, which should not affect the principle of the disclosure.

BS 10 provides radio protocol Layer-1 (Physical Layer) to Layer-3 (Radio Resource Control (RRC) Layer) connections to the UE 30B and the RN 20 through an Access Link (AL) and a Backhaul Link (BL), respectively. The RN 20 provides radio protocol Layer-1 to Layer-3 connections to the UE 30A through a RN-access link (AL1). Since RN 20 is connected to BS 10 by the backhaul link (BL), the BS 10 and the RN 20 correspond to the above-mentioned Donor BS and RN, respectively. Although FIG. 1 shows that the Donor BS 10 and the RN 20 are respectively connected to a single UE, both Donor BS 10 and RN 20 are capable of providing connections to multiple UEs simultaneously.

Relaying function enables an operator to improve and extend the coverage of a BSby having RN wirelessly connected to the BS. Evolved Universal Terrestrial Radio Access Network (E-UTRAN) supports relaying by having a RN wirelessly connect to an eNB serving the RN, called Donor eNB (DeNB), via a modified version of the Evolved Universal Terrestrial Radio Access (E-UTRA) radio interface, i.e. the backhaul link (BL), also referred to as the Un interface. The relaying function and use of RN/DeNB entities in a network is transparent to the operations of the UEs connected.

The RN supports the eNB functionality meaning it, among other things, terminates the radio protocols of the E-UTRA radio interface, and the S1 and X2 interfaces. From a specification point of view, functionality defined for eNBs, e.g., RNL (Radio Network Layer) and TNL (Transport Network Layer), also apply to RN unless explicitly specified. In addition to the eNB functionality, the RN also supports a subset of the UE functionality, e.g., Physical Layer, Layer-2, RRC, and NAS functionality, in order to wirelessly connect to the DeNB.

Figure 2:
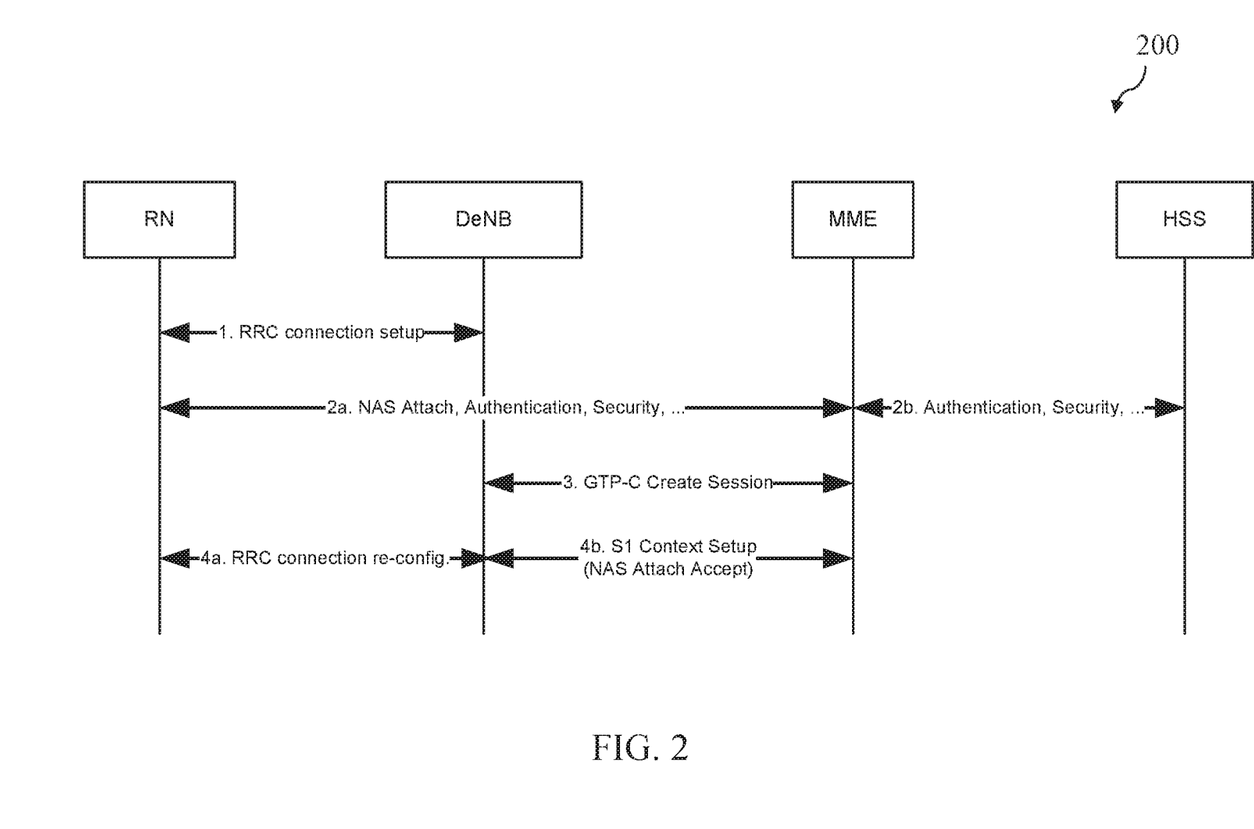
FIG. 2 illustrates a sequence diagram of an exemplary attach procedure for a RN according to an embodiment of the present disclosure.

RN connects to DeNB via the Un interface using the same radio protocols and procedures as a UE connecting to an eNB. FIG. 2 illustrates a sequence diagram of an exemplary attach procedure 200 for RN according to an embodiment of the present disclosure. The procedure is the same as the normal UE attach procedure in 3GPP specification TS 23.401 with the following exceptions:

DeNB is made aware of which MMEs support RN functionality via the S1 Setup Response message earlier received from the MMEs;

RN sends an RN indication to the DeNB during RRC connection establishment;

After receiving the RN indication from the RN, the DeNB sends the RN indicator and the IP address of the S-GW/P-GW function embedded in the DeNB, within the Initial UE Message, to an MME supporting RN functionality;

MME selects S-GW/P-GW for the RN based on the IP address included in the Initial UE Message;

During the attach procedure, the EPC checks if the RN is authorized for relay operation; only if the RN is authorized, the EPC accepts the attach and sets up a context with the DeNB; otherwise the EPC rejects the attach.

After the attach procedure, RN is preconfigured with information about which cells (DeNBs) it is allowed to access.

3GPP is envisioning an Integrated Access and Backhaul (IAB) architecture for the 5G (NR) communication networks supporting multiple-hop relays. That is, a RN may hop through one or more RNs before reaching the Donor BS. Therefore, there is a need for handling the relationship between a RN and its neighboring RN(s) when multiple-hop is supported. For example, there is a need for a procedure for discovering a link between RN and its Donor BS and a procedure for discovering a link between the RN and its neighbor RN(s). Embodiments of the present disclosure propose technical solutions for relay discovery, which can at least solve the above technical problems in the new generation communication systems, such as 5G communication systems. More details on the embodiments of the present disclosure will be illustrated in the following text in combination with the appended drawings.

Figure 3:
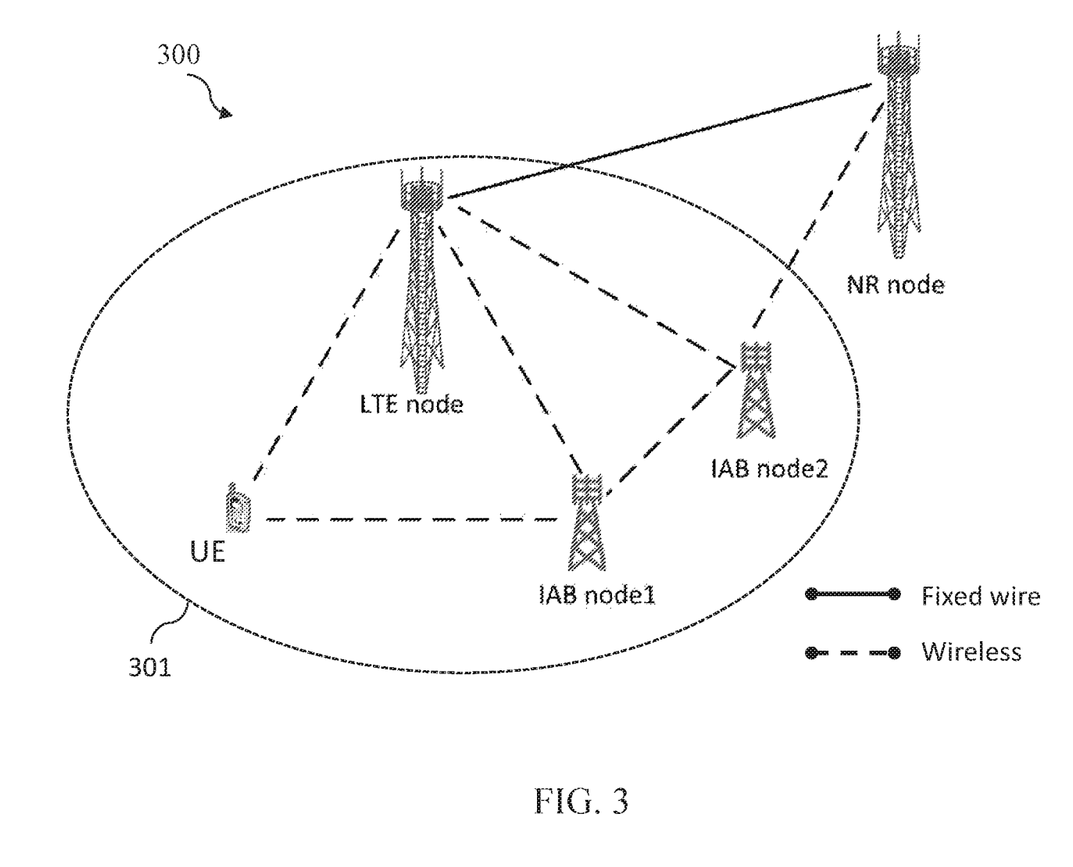
FIG. 3 illustrates a schematic wireless communication system according to a first embodiment of the present disclosure.

FIG. 3 illustrates a wireless communication system 300 according to a first embodiment of the present disclosure. In FIG. 3, all the relays, i.e., IAB node 1 and IAB node 2, are located within the coverage area 301 of the LTE node.

In practice, 5G coverage may be limited in the initial deployment and interworking with the legacy LTE network is unavoidable. Therefore, it is required that RN(s) can operate in both stand-alone (SA) and non-stand-alone (NSA) deployments, and both SA and NSA are supported for the access link. In addition, it is required that both SA and NSA can be supported for the backhaul links.

Figure 4:
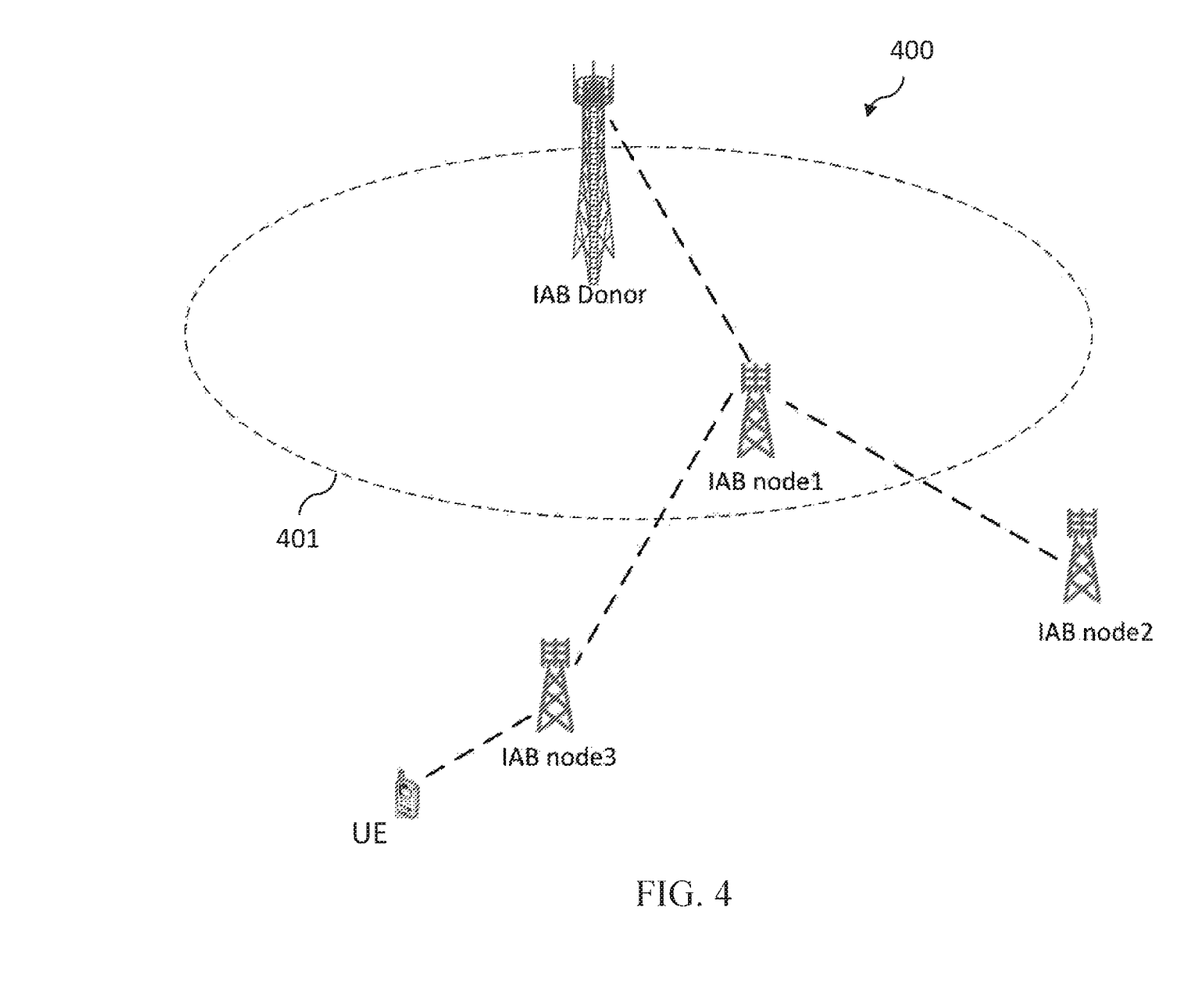
FIG. 4 illustrates a schematic wireless communication system according to a second embodiment of the present disclosure.

FIG. 4 illustrates a wireless communication system 400 according to a second embodiment of the present disclosure. As shown in FIG. 4, IAB node 1 is located within the coverage are 401 of its Donor BS, i.e., IAB Donor, and represents an in-coverage RN. Due to obstacles, for example, buildings in urban environment for in-clutter deployments, both IAB node 2 and IAB node 3 are located outside of the coverage area 401 of IAB Donor, and represent out-of-coverage RNs.

IAB node 2 and IAB node 3 can reach IAB Donor by hopping through IAB node 1. In this way, multi-hop backhauling enables backhauling around obstacles, e.g., buildings in urban environment for in-clutter deployments, and thus provides larger range extension than single hop. Higher frequency bands, such as frequency bands above 6 GHz, have limited range of radio signals, and can profit from such larger range extension.

From the above, it can be seen that the relay discovery procedure can be described in two scenarios, i.e., Scenario 1: all the relay nodes are located in the coverage area of Donor BS; and Scenario 2: both in-coverage relay nodes and out-of-coverage relay nodes are involved. Accordingly, the present disclosure proposes a centralized solution and a distributed solution for the two scenarios, respectively, which will be explained in detail in the following text in combination with the appended drawings.

Figure 5:
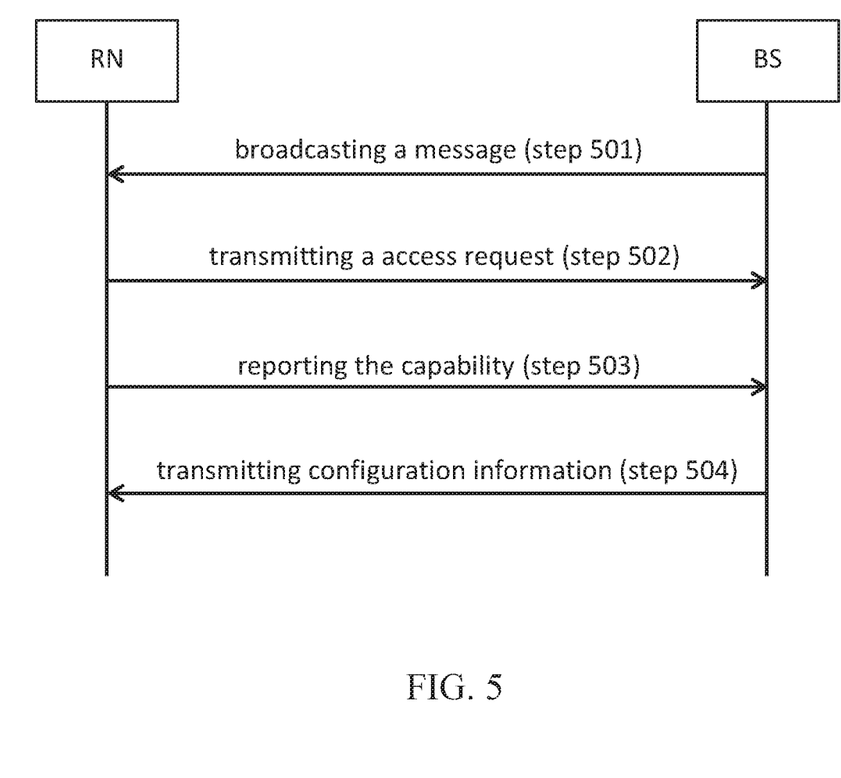
FIG. 5 illustrates a sequence diagram of an exemplary procedure for a discovery between a relay and a base station according to an embodiment of the present disclosure.

Centralized Procedure for Scenario 1:

FIG. 5 illustrates an exemplary discovery procedure between a RN and a base station (BS) according to an embodiment of the present disclosure. As shown in FIG. 5, signaling communication between RN and BS is performed. This procedure may be used for relay node connection and reconfiguration. In one embodiment, the RN is an IAB node. For example, the RN may be IAB node 1 in FIG. 3.

Step 501 shows that a base station may broadcast a message indicating that the base station supports relaying function. The message may be defined in various ways. In one embodiment, the message is an indicator having at least one bit. In another embodiment, the message includes configuration information for the relaying function, and the presence of the configuration information indicates that access to the base station is allowed. For example, if RN receives a relay configuration information transmitted by a base station as part of system information broadcast, the RN considers that the base station (e.g., an eNB or a gNB) supports the relay functionality. Otherwise, the RN considers that the eNB or gNB does not support the relay functionality. In some embodiments, the broadcasted configuration information may Time Division Multiplexing (TDM) resources, Frequency Division Multiplexing (FDM) resources or Space Division Multiplexing (SDM) resources for the RN in the in-band case.

After determining that a relaying function is supported by the base station, the RN may accesses the base station at step 502. For example, the RN may transmit an access request to the base station. Then, at step 503, the RN may further transmit its capability to the base station.

In some embodiments, the capability information of the RN may include one or more of the following:

Access link type: NR access, LTE access or both;
Backhaul link type: SA or NSA or both;
In-band (i.e., access and backhaul links at least partially overlap in frequency) or out-of-band relays (i.e., access and backhaul links can operate independently); or
Half-duplex (i.e., reception and transmission cannot be performed at the same time) or full-duplex (i.e., reception and transmission can be performed at the same time).

At step 504, the base station may (re)configure the RN by transmitting configuration information to the RN. In one embodiment, such configuration information may include at least a threshold for relay selection. This threshold is a parameter for determining whether a RN should report a detected neighboring RN and will be described later.

In a preferred embodiment, the configuration information further includes an identification of the base station. In some embodiments, an identification of a base station may be an identification of a cell of one or more cells of the base station. In one embodiment, after the receiving the identification of the base station, the RN may broadcast it. A neighboring RN thus can identify whether the RN and the neighboring RN are belonging to the same Donor base station, which is described below with respect to FIG. 6.

Figure 6:
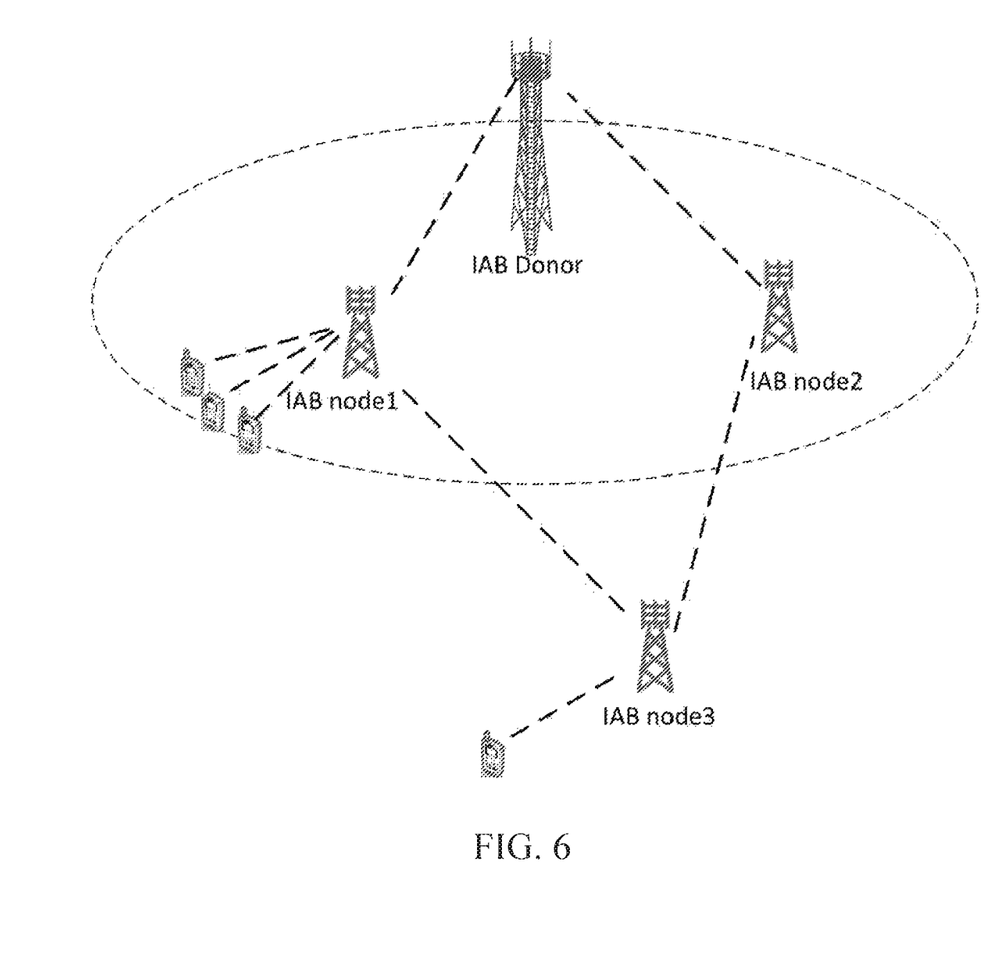
FIG. 6 illustrates an exemplary procedure for relay reselection according to an embodiment of the present disclosure.

FIG. 6 illustrates an exemplary procedure for relay node (IAB node) reselection according to an embodiment of the present disclosure. At the beginning, IAB node 3 is connected to IAB node 1, through which IAB node 3 can reach IAB Donor. However, due to decreased channel quality or heavy loading at IAB node 1 or other factors, IAB node 3 may want to reselect an IAB node it is connected to. For example, the IAB node 3 may reselect IAB node 2 in response to further determining that both IAB node 1 and IAB node 2 both belong to the same IAB Donor.

Figure 7:
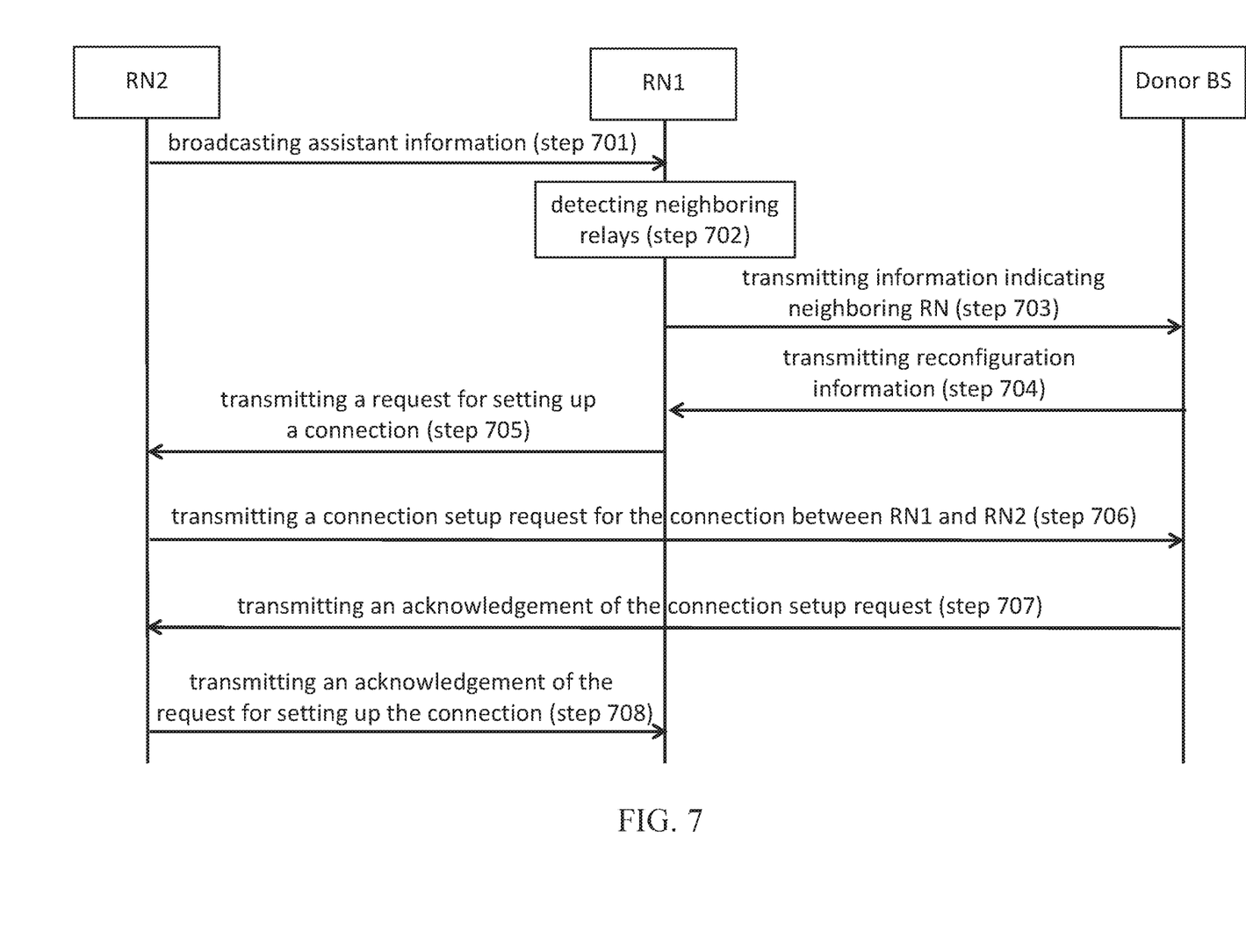
FIG. 7 illustrates a sequence diagram of an exemplary procedure for a discovery between two relays according to an embodiment of the present disclosure.

FIG. 7 illustrates an exemplary procedure for a discovery between two RNs according to an embodiment of the present disclosure. As shown in FIG. 7, signaling communication between two RNs (i.e., RN1 and RN2) and a Donor BS is performed. The procedure in FIG. 7 may occur after RN1 attaches to the Donor BS according to the discovery procedure described in FIG. 5. Both RN1 and RN2 are located within the coverage of the Donor BS. In one embodiment, the RNs are IAB nodes. For example, RN1 and RN2 may be IAB node 1 and IAB node 2, respectively, in FIG. 3.

At step 701, RN2 may broadcast assistant information for discovering neighboring RNs. In some embodiments, the assistant information may include an identification of RN2 and an identification of the Donor BS. In other embodiments, the assistant information may include an identification of RN2 and an identification list indicating one or more Donor BSs serving RN2. In these embodiments, an identification of a Donor BS may be an identification of a cell of one or more cells of the Donor BS.

In a preferred embodiment, the assistant information may further include the number of hops from RN2 to the Donor BS. This assistant information can be used for relay node selection or reselection. For example, RN1 may select a neighboring RN among a plurality of discovered neighboring RNs which has the smallest number of hops to the Donor BS, and establish a connection with the selected neighboring RN.

At step 702, RN1 may detect neighboring relays. For example, RN1 may detect RN2. In some embodiments, RN1 performs the detection based on the resource configured by a Donor BS for in-coverage relay. RN1 may further determine whether both RN1 and RN2 are belonging to the same Donor BS.

In a preferred embodiment, RN1 may determine whether the channel quality between RN1 and a discovered neighboring relay is equal to or greater than a threshold for relay selection. As mentioned above, the threshold may be received from the Donor BS. If the channel quality between RN1 and the discovered neighboring relay is equal to or greater than the threshold, RN1 may include an identification of the discovered neighboring relay in a relay list for reporting to the Donor BS; otherwise, RN1 will not include the discovered neighboring relay in the list. For example, RN1 may determine that the channel quality between RN1 and RN2 is equal to or greater than the threshold for relay selection, and then may include an identification of RN2 in the relay list.

At step 703, RN1 may transmit information indicating detected neighboring RN to the Donor BS. The information may include the relay list. In some embodiments, the information may further include at least one of a measurement result of the channel quality between RN1 and a neighboring RN (e.g., RN2) in the list, or an identification of the Donor BS or another Donor BS. In these embodiments, an identification of a Donor BS may be an identification of a cell of one or more cells of the Donor BS. In one embodiment, the measurement result is RSRP (Reference Signal Received Power) or RSRQ (Reference Signal Received Quality).

At step 704, the Donor BS may reconfigure RN1 by transmitting reconfiguration information indicating a neighboring RN (e.g., RN2) or an updated rely list to RN1. The reconfiguration information may indicate that the connection between RN1 and RN2 is allowed.

At step 705, RN1 may transmits to a neighboring RN, e.g., RN2, indicated in the updated relay list, a request for setting up a connection between RN1 and the neighboring RN. For example, the updated relay list may include an identification of RN2. RN1 may transmit to RN2 a request for setting up a connection between RN1 and RN2. In some embodiments, the request includes an identification of the Donor BS and/or an identification of RN1. In these embodiments, an identification of a Donor BS may be an identification of a cell of one or more cells of the Donor BS.

At step 706, RN2 may transmit a connection setup request for the connection between RN1 and RN2 to the Donor BS serving both RN1 and RN2. In some embodiments, the connection setup request includes an identification of RN1 and/or an identification of RN2.

At step 707, the Donor BS may transmit an acknowledgement of the connection setup request to RN2. At step 708, RN2 may transmit an acknowledgement of the request for setting up the connection to RN1.

Distributed Procedure for Scenario 2:

The exemplary procedure for a discovery between RN and a base station in the distributed procedure is similar to the exemplary procedure as shown in FIG. 5 except that the configuration information in step 504 is different. That is, in the current procedure, the configuration information may include a threshold for relay node selection, based on which a RN may determine whether to establish a connection with a neighboring RN. In some embodiments, a Donor BS may only configure the threshold for an in-coverage relay. As described above, the threshold indicates which neighboring relay is allowed to setup a connection. A relay node (e.g., IAB node 1 in the FIG. 6) can make a decision whether to establish a connection with a neighboring relay node based on the channel quality and loading. The threshold for relay node selection will be described in detail in the following text. The remaining operations are similar to the example in FIG. 5 and thus are omitted herein.

Figure 8:
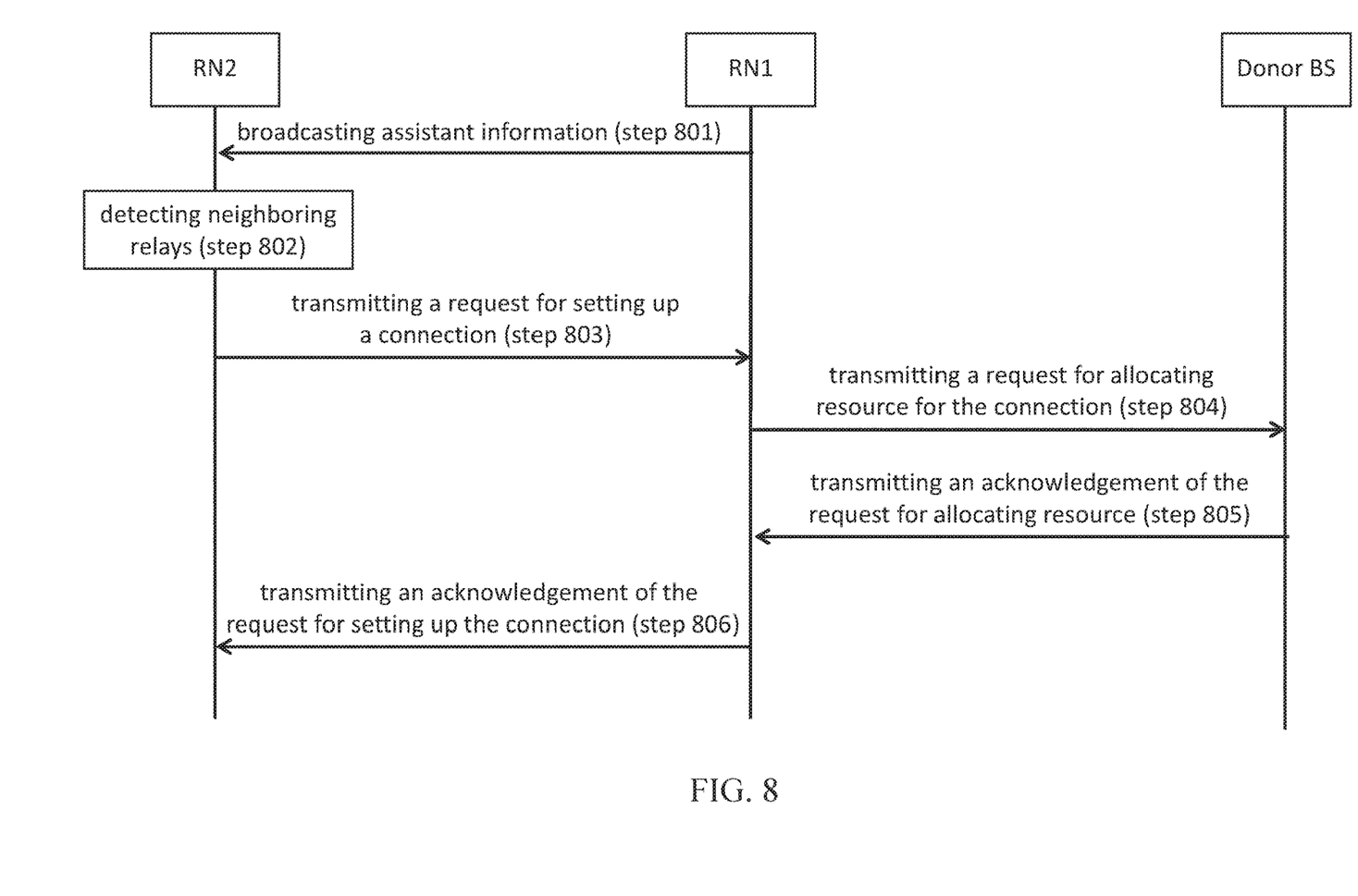
FIG. 8 illustrates a sequence diagram of an exemplary procedure for a discovery between two relays according to an embodiment of the present disclosure.

FIG. 8 illustrates an exemplary procedure for a discovery between two RNs according to an embodiment of the present disclosure. As shown in FIG. 8, signaling communication between two RNs (i.e., RN1 and RN2) and a Donor BS is performed. RN1 is located within the coverage of the Donor BS, and RN2 is located outside of the coverage of the Donor BS. In one embodiment, the RNs are IAB nodes. For example, RN1 and RN2 may be IAB node 1 and IAB node 2, respectively, in FIG. 4.

At step 801, RN1 may broadcast assistant information for discovering neighboring RNs. In some embodiments, the assistant information may include an identification of RN1 and an identification of the Donor BS. In other embodiments, the assistant information may include an identification of RN1 and an identification list indicating one or more Donor BSs serving RN1. In these embodiments, an identification of a Donor BS may be an identification of a cell of one or more cells of the Donor BS.

In a preferred embodiment, the assistant information may further include a threshold for relay selection. As mentioned above, the threshold may be received from the Donor BS.

At step 802, RN2 may detect neighboring relays. For example, RN2 may detect RN1. In some embodiments, RN2 performs the detection based on pre-configured resource for out-of-coverage relay, and receives the threshold broadcasted by RN1.

In a preferred embodiment, RN2 may determine whether the channel quality between RN2 (e.g., IAB node 2 or IAB node 3 in FIG. 6) and a discovered neighboring relay (e.g., IAB node 1 in FIG. 6) is equal to or greater than the threshold for relay selection. If the channel quality between RN2 and the discovered neighboring relay is equal to or greater than the threshold, RN2 may transmit a request for setting up a connection between RN2 and the discovered neighboring relay to a neighboring RN. For example, RN2 may determine that the channel quality between RN1 and RN2 is equal to or greater than the threshold for relay selection, and then transmit to RN1 a request for setting up a connection between RN2 and RN1 at step 803.

At step 804, RN1 may transmit a request for allocating resource for the connection to the Donor BS, the request for allocating resource including an identification of RN2. At step 805, the Donor BS may transmit an acknowledgement of the request for allocating resource to RN1. In some embodiments, upon receiving the request, the Donor BS may allocate resource for the connection between RN2 and RN1, and transmit the resource allocated to the connection.

At step 806, RN1 may transmit an acknowledgement of the request for setting up the connection to RN2. In some embodiments, RN1 may further transmit the resource allocated to the connection to RN2. The resource may include time-frequency resources.

Figure 9:
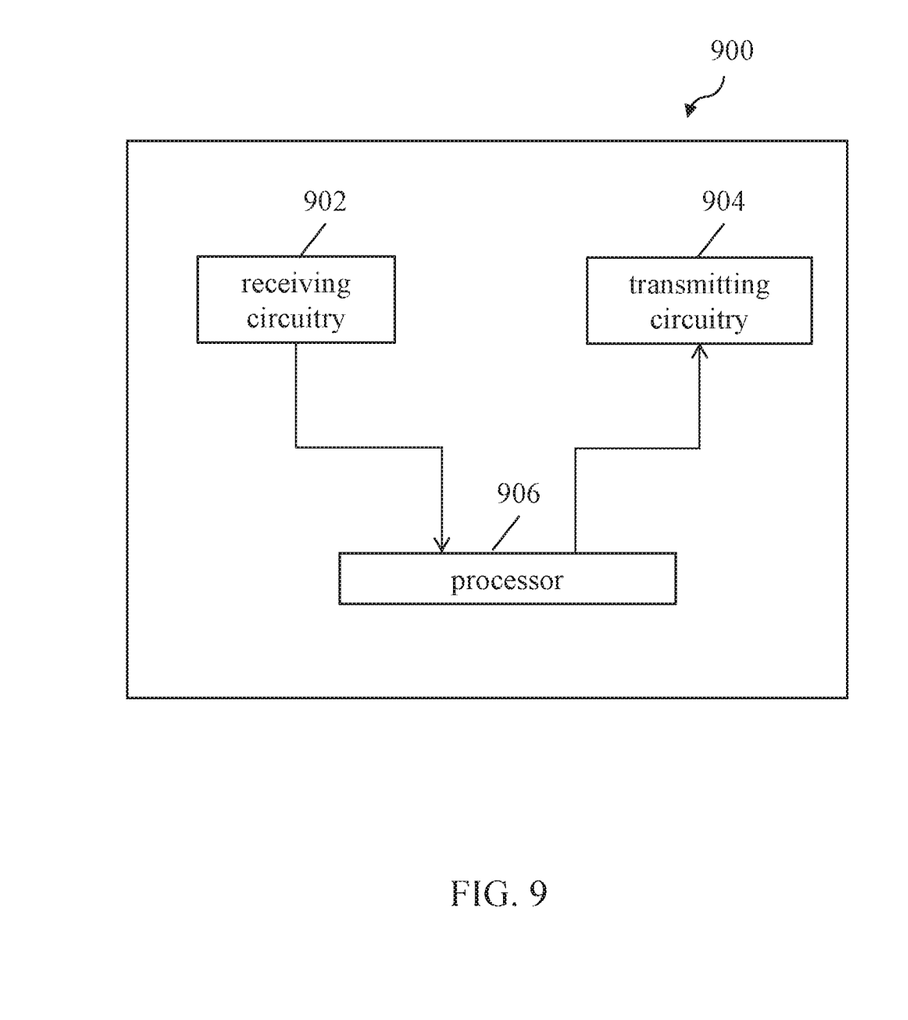
FIG. 9 illustrates an example block diagram of an apparatus according to an embodiment of the present disclosure.

FIG. 9 illustrates a block diagram of an apparatus 900 according to an embodiment of the present disclosure.

As shown in FIG. 9, the apparatus 900 may include a non-transitory computer-readable medium (not shown), a receiving circuitry 902, a transmitting circuitry 904, and a processor 906 coupled to the non-transitory computer-readable medium, the receiving circuitry and the transmitting circuitry. The apparatus 900 may be a base station or a relay. Although in this figure, elements such as processor, transmitting circuitry, and receiving circuitry are described in the singular, the plural is contemplated unless limitation to the singular is explicitly stated. In some embodiments, the receiving circuitry 902 and the transmitting circuitry 904 are combined into a single device, such as a transceiver. In certain embodiments, the apparatus 900 may further include an input device, a memory, and/or other components.

In some embodiments, the non-transitory computer-readable medium may have stored thereon computer-executable instructions to cause a processor to implement the steps with respect to the RN as described above. For example, the computer-executable instructions, when executed, cause the processor 906 interacting with receiving circuitry 902 and transmitting circuitry 904, so as to perform the steps with respect to the RNs depicted in FIGS. 5, 7, and 8.

In other embodiments, the non-transitory computer-readable medium may have stored thereon computer-executable instructions to cause a processor to implement the steps with respect to the base station as described above. For example, the computer-executable instructions, when executed, cause the processor 906 interacting with receiving circuitry 902 and transmitting circuitry 904, so as to perform the steps with respect to the BS or Donor BS depicted in FIGS. 5, 7, and 8.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The following is what is claimed:

1. A method at a communication device, the method comprising:
   receiving a broadcasting message from a base station, wherein the broadcasting message indicates that the base station supports a relaying function; and
   in response to receiving the broadcasting message indicating that the base station supports the relaying function:
      accessing the base station; and
      transmitting capability information of the communication device to the base station.

2. The method of claim 1, wherein the broadcasting message includes an indicator having at least one bit.

3. The method of claim 1, wherein:
   the broadcasting message includes configuration information for the relaying function; and
   the presence of the configuration information indicates that access to the base station is allowed.

4. The method of claim 1, further comprising receiving configuration information from the base station, wherein the configuration information includes at least a threshold for relay selection and an identification of the base station.

5. The method of claim 4, wherein the configuration information further includes an identification of the base station.

6. A method at a base station, the method comprising:
   broadcasting, from the base station, a message that indicates that the base station supports a relaying function; and
   in response to broadcasting the message that indicates that the base station supports the relaying function:
      receiving an accessing request from a first communication device; and
      receiving capability information of the first communication device.

7. The method of claim 6, wherein the message includes an indicator having at least one bit.

8. The method of claim 6, wherein the message includes configuration information for the relaying function, and the presence of the configuration information indicates that access to the base station is allowed.

9. The method of claim 6, further comprising transmitting configuration information to the first communication device, wherein the configuration information includes at least a threshold for relay selection.

10. The method of claim 9, wherein the configuration information further includes an identification of the base station.

11. An apparatus comprising a communication device, the apparatus further comprising:
    a receiver to receive a broadcasting message from a base station, wherein the broadcasting message indicates that the base station supports a relaying function;
    a processor; and
    a transmitter, wherein, in response to receiving the broadcasting message indicating that the base station supports the relaying function:
       the processor accesses the base station by way of the communication device; and
       the transmitter transmits capability information of the communication device to the base station.

12. The apparatus of claim 11, wherein the broadcasting message includes an indicator having at least one bit.

13. The apparatus of claim 11, wherein:
    the broadcasting message includes configuration information for the relaying function; and
    the presence of the configuration information indicates that access to the base station is allowed.

14. The apparatus of claim 11, wherein the receiver to receive configuration information from the base station, and the configuration information includes at least a threshold for relay selection and an identification of the base station.

* * * * *